(12) United States Patent
Norman et al.

(10) Patent No.: US 9,038,607 B2
(45) Date of Patent: May 26, 2015

(54) AIR COOLER AND METHOD FOR OPERATION OF AN AIR COOLER

(71) Applicant: Ford Global Technologies, LLC, Dearborn, MI (US)

(72) Inventors: Kristofor Robert Norman, Canton, MI (US); Shuya Shark Yamada, Novi, MI (US); Jim Raymond Palm, Ypsilanti Township, MI (US); John R. Ladd, Commerce Township, MI (US); Michael Thomas Kramer, Grosse Pointe, MI (US); Jim Tyler, Livonia, MI (US)

(73) Assignee: Ford Global Technologies, LLC, Dearborn, ME (US)

( * ) Notice: Subject to any disclaimer, the term of this patent is extended or adjusted under 35 U.S.C. 154(b) by 19 days.

(21) Appl. No.: 13/761,070

(22) Filed: Feb. 6, 2013

(65) Prior Publication Data

US 2014/0216367 A1    Aug. 7, 2014

(51) Int. Cl.
*F01P 1/00* (2006.01)
*F02B 29/04* (2006.01)

(52) U.S. Cl.
CPC ............. *F01P 1/00* (2013.01); *F02B 29/0456* (2013.01); *Y02T 10/146* (2013.01); *Y02T 10/121* (2013.01); *F02B 29/0406* (2013.01)

(58) Field of Classification Search
CPC .... F01P 1/00; F02B 29/0425; F02B 29/0431; F02B 29/0456; F02B 29/0493; F02M 31/20
USPC ............ 123/41.02, 41.48, 41.56, 41.58, 540, 123/559.1, 563; 165/55, 56, 96, 140
See application file for complete search history.

(56) References Cited

U.S. PATENT DOCUMENTS

| | | | | |
|---|---|---|---|---|
| 4,501,321 A * | 2/1985 | Real et al. | | 165/153 |
| 4,593,749 A * | 6/1986 | Schatz | | 165/283 |
| 5,152,144 A * | 10/1992 | Andrie | | 60/599 |
| 5,228,512 A * | 7/1993 | Bretl et al. | | 165/153 |
| 7,017,656 B2 * | 3/2006 | Beddome et al. | | 165/82 |
| 7,510,174 B2 * | 3/2009 | Kammerzell | | 261/153 |
| 7,828,044 B2 * | 11/2010 | Hagberg et al. | | 165/96 |
| 7,878,233 B2 * | 2/2011 | Bates et al. | | 165/153 |
| 8,061,135 B2 | 11/2011 | Rutherford | | |
| 2005/0081523 A1 * | 4/2005 | Breitling et al. | | 60/599 |
| 2007/0251249 A1 | 11/2007 | Burk | | |
| 2007/0251262 A1 | 11/2007 | Pettersson | | |
| 2009/0133860 A1 | 5/2009 | Harada et al. | | |
| 2010/0300647 A1 * | 12/2010 | Steurer et al. | | 165/52 |
| 2012/0097362 A1 * | 4/2012 | Kanstad et al. | | 165/45 |

* cited by examiner

*Primary Examiner* — Stephen K Cronin
*Assistant Examiner* — Grant Moubry
(74) *Attorney, Agent, or Firm* — Julia Voutyras; Alleman Hall McCoy Russell & Tuttle LLP

(57) ABSTRACT

An air cooler line is provided. The air cooler lines includes a first air cooler having a plurality of air flow conduits, each of the air flow conduits including an inlet, and a first air flow deflector extending across peripheral portions of the inlets and fixedly coupled to the air flow conduits and a second air cooler having a plurality of air flow conduits, each of the air flow conduits including an inlet, and a second air flow deflector extending across peripheral portions of the inlets and fixedly coupled to the air flow conduits, the second air flow deflector differing in at least one of size and geometry than the first air flow deflector.

15 Claims, 7 Drawing Sheets

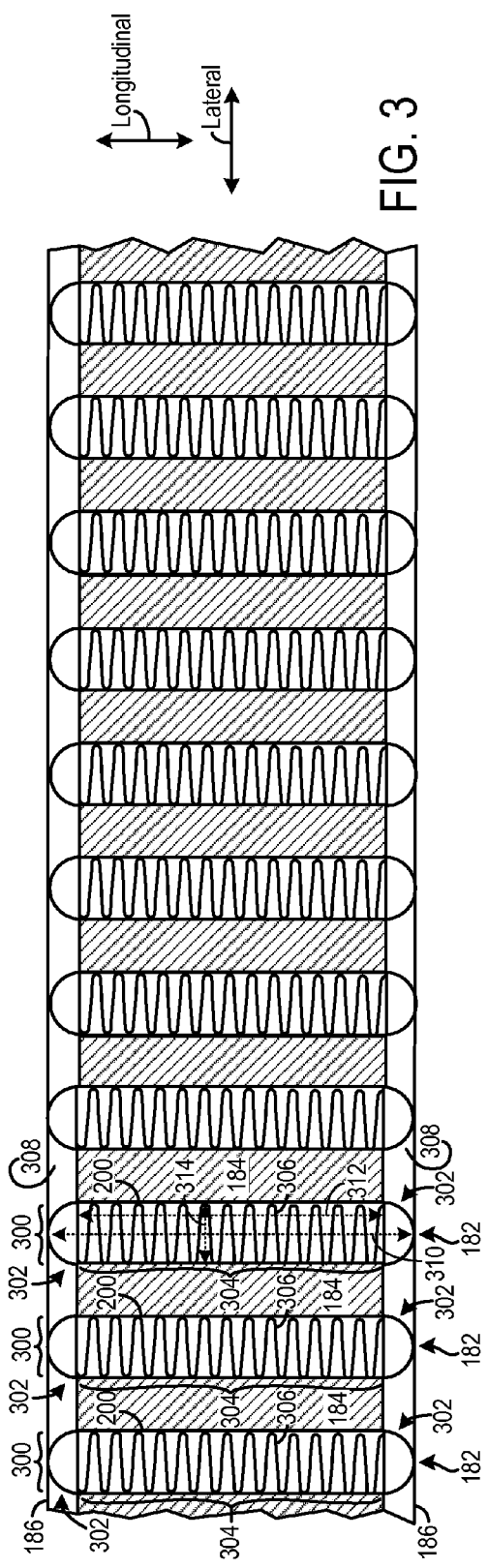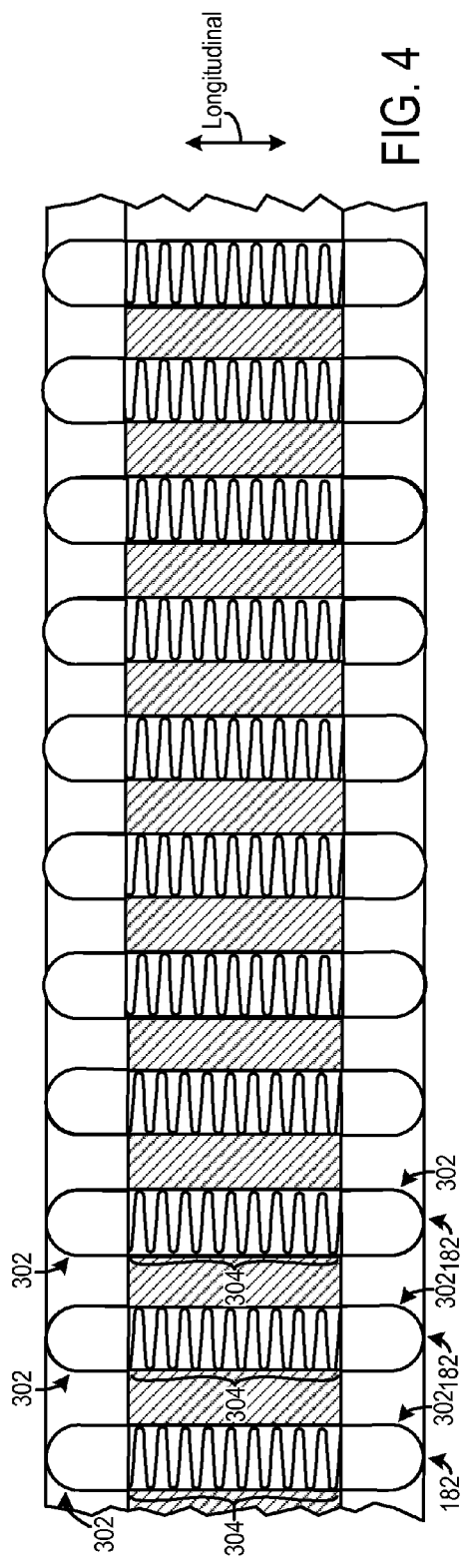

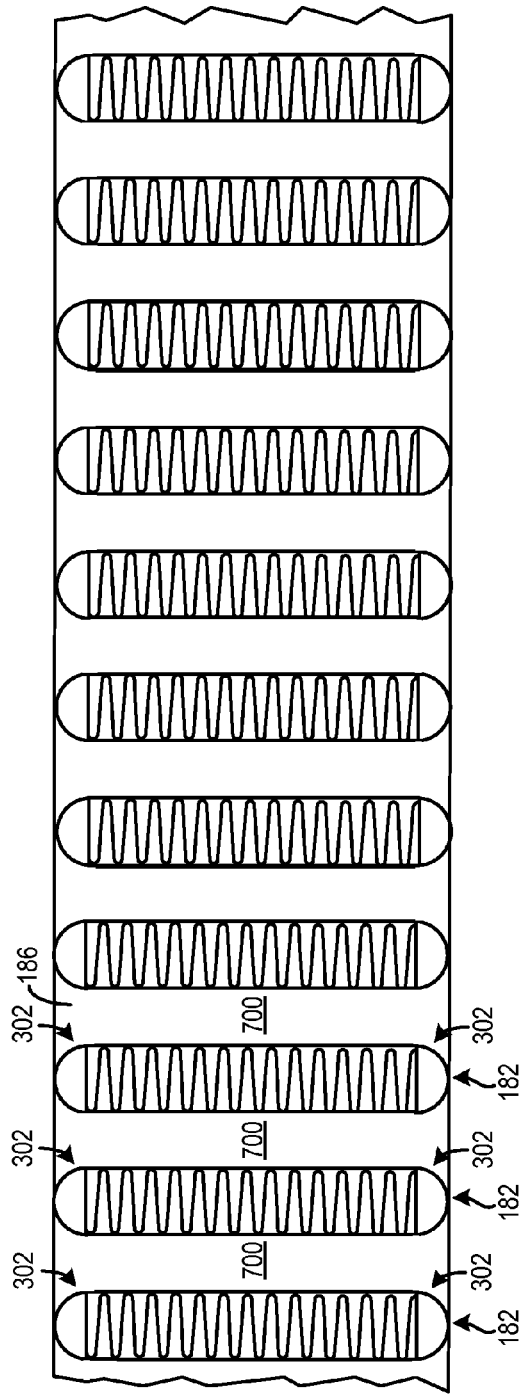
FIG. 7
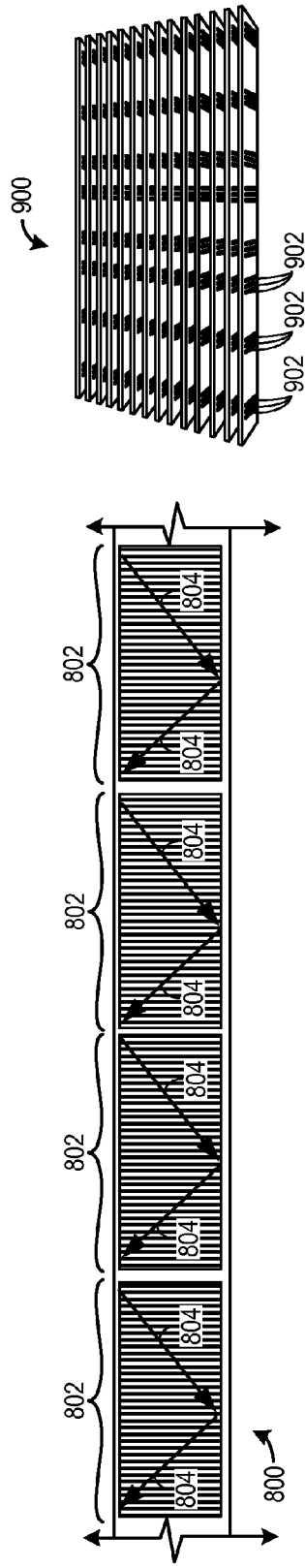
FIG. 9
FIG. 8

AIR COOLER AND METHOD FOR OPERATION OF AN AIR COOLER

FIELD

The present disclosure relates to an air cooler in an intake system of on engine.

BACKGROUND AND SUMMARY

Compressors are used in engine intake systems to increase the density of the intake air. Consequently, the combustion output may be increased, emissions may be decreased, and/or fuel economy may be increased. However, compressing intake air also increases the temperature of the intake air. This increase in air temperature decreases air density, thereby diminishing some of the gains achieved via compression of the intake air. Therefore, air coolers positioned downstream of compressors may be used to decrease the temperature of compressed intake air in boosted engines. Air coolers may also be used in conjunction with other systems in the vehicle such as exhaust gas recirculation (EGR) systems to decrease the temperature of the exhaust gas delivered to the intake system.

Charge air coolers may be designed for specific engine applications. Specifically, the size and geometry of air flow passages in air coolers may be sized for a specific engine or vehicle. When the air coolers are uniquely sized for an engine, the applicability of the air cooler is decreased. For example, if a specified air cooler were used in another engine or vehicle configuration, the engine may experience misfires due to condensation build up caused by the mis-sizing. As a result, combustion efficiency may be decreased. Furthermore, misfires may be exacerbated when the intake air is humid, a large amount of torque is requested by the vehicle operation (e.g., open throttle conditions), and/or during a downshift in a transmission.

The inventors herein have recognized the above issues and developed an air cooler line. The air cooler lines includes a first air cooler having a plurality of air flow conduits, each of the air flow conduits including an inlet, and a first air flow deflector extending across peripheral portions of the inlets and fixedly coupled to the air flow conduits and a second air cooler having a plurality of air flow conduits, each of the air flow conduits including an inlet, and a second air flow deflector extending across peripheral portions of the inlets and fixedly coupled to the air flow conduits, the second air flow deflector differing in at least one of size and geometry than the first air flow deflector.

In this way, an air cooler line may be provided for a number of vehicles, thereby increasing the applicability of the air cooler line and decreasing manufacturing costs. The size and geometry of the air flow deflectors may be adjusted to achieve desired air-flow characteristics in each of the air coolers via differences in the flow deflector selected. In this way, manufacturing costs and complexity can be reduced, while still decreasing condensation build-up, if desired. When condensation is decreased in the air coolers, mis-fires in the engine are reduced and the air cooler's reliability is increased.

In one example, the plurality of air flow conduits in the first air cooler and the plurality of air flow conduits in the second air cooler may be identical in size and geometry. In this way, the air flow conduits are standardized across the air cooler line, enabling the manufacturing costs of the line to be further decreased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 3 shows an example cross-sectional view of the air cooler shown in FIG. 2;

FIGS. 4-7 show different examples of the same cross-section of the air cooler shown in FIG. 2;

FIG. 8 shows a cross-sectional view of a plurality of turbulators in an air flow conduit included in the air cooler shown in FIG. 2;

FIG. 9 shows an example turbulator that may be included in the air cooler shown in FIG. 2;

FIGS. 2 and 9 are drawn approximately to scale, however other relative dimensions may be used if desired.

DETAILED DESCRIPTION

An air cooler line is described herein. The air cooler line may include two air coolers each having a plurality of air flow conduits with a similar size and shape. The two air coolers may each include an air flow deflector extending across a portion of the inlets of the respective air flow conduits. The air flow deflectors may differ in size and/or shape. Thus, the unobstructed portions of the inlets of the air flow conduits may vary between the two air coolers. In this way, the air flow conduits may be standardized across air cooler while the air flow deflectors may be modified to achieve desired air flow characteristics in each air cooler. In this way, the size and shape of the air coolers may be adjusted for different engines sizes, types, etc., thereby increasing the air cooler lines applicability. As a result, manufacturing cost of the air coolers in the air cooler line may be reduced when the air coolers in the line can be used in a wide range of engine types, sizes, etc. For example, the first cooler in the line may be used for a first vehicle with a larger engine displacement, and the second cooler in the line may be used for a second vehicle with a smaller engine displacement.

Additionally, the air flow deflectors in each of the air coolers obstruct airflow entering the air flow conduits differently. The size and shape of the air flow deflectors may be selected based on a desired air flow velocity range through the air flow conduits. Specifically, the air flow velocity range may be selected to reduce condensation in the air flow conduits. Consequently, the likelihood of misfires caused by condensation formation is reduced and combustion efficiency is increased. Therefore, the selected air flow velocity range may self clean condensate from the air cooler by pushing the condensate from the conduits. Decreasing condensation in the air cooler increases the longevity of the air cooler.

Figure 1:
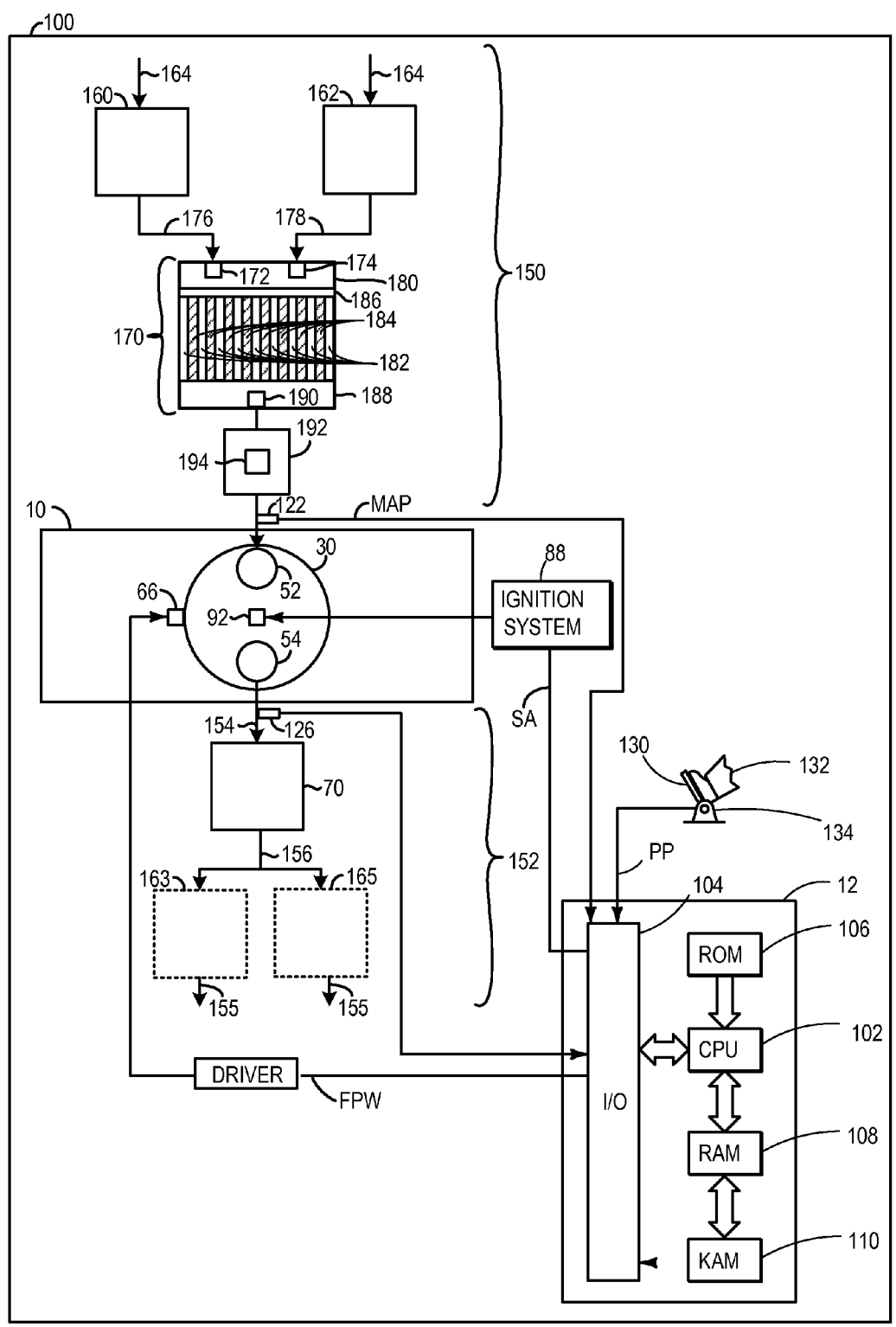
FIG. 1 shows a schematic depiction of an engine, intake system including an air cooler, and an exhaust system.

FIG. 1 shows a schematic diagram of an engine 10 included in a propulsion system of a vehicle 100. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls (not shown) with a piston (not shown) positioned therein.

An intake system 150 and exhaust system 152 in fluidic communication with the engine 10 are also shown in FIG. 1. However, it will be appreciated that in some examples the intake system 150 and/or exhaust system 152 may be integrated into the engine 10.

The exhaust system 152 includes an exhaust passage denoted via arrow 154 (e.g., exhaust manifold) and an emission control device 70. Arrows 156 denote exhaust passages coupled to an outlet of the emission control device 70. It will be appreciated that the emission control device 70 may be arranged along the exhaust passage 154. The emission control device 70 is positioned downstream of an exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

A first turbine 163 and a second turbine 165 may also be included in the exhaust system 152. The first turbine 163 and the second turbine 165 are positioned downstream of the emission control device 70 in the depicted example. However, in other examples the first and/or second turbine (163 and 165) may be positioned upstream of the emission control device 70 or a plurality of emission control devices. Arrows 155 denote exhaust passages coupled to the outlets of the first and second turbines (163 and 165).

The engine 10 includes at least one cylinder 30. The cylinder 30 includes intake valve 52 and exhaust valve 54. However in other examples, the cylinder 30 may include two or more intake valves and/or two or more exhaust valves. The intake valve 52 is configured to cyclically open and close to permit and inhibit intake air from flowing from the intake system 150 to the cylinder 30. Likewise, the exhaust valve 54 is configured to cyclically open and close to permit and inhibit exhaust gas from flowing from the cylinder 30 to the exhaust system 152. The valves may be actuated by cams. Variable cam timing may be used in the engine 10, if desired. However, in other examples electronic valve actuation may be used to actuate at least one of the intake valve 52 and the exhaust valve 54.

Fuel injector 66 is shown coupled to the cylinder 30 that provides what is known as direct fuel injection to the cylinder. Fuel injector 66 may inject fuel in proportion to the pulse width of signal FPW received from controller 12 via electronic driver 68. In some examples, cylinder 30 may alternatively or additionally include a fuel injector coupled to an exhaust manifold upstream of the intake valve 52 in a manner known as port fuel injection.

Ignition system 88 can provide an ignition spark to cylinder 30 via spark plug 92 in response to spark advance signal SA from controller 12, under select operating modes. Though spark ignition components are shown, in some examples, cylinder 30 or one or more other combustion chambers of engine 10 may be operated in a compression ignition mode, with or without an ignition spark.

Exhaust gas sensor 126 is shown coupled to exhaust passage 154 of exhaust system 152 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors included in the engine 10 such as an absolute manifold pressure signal, MAP, from sensor 122. It will be appreciated that in other examples the controller 12 may receive signals from additional sensors such as a throttle position sensor, an engine temperature sensor, an engine speed sensor, etc.

During operation, the cylinder 30 in the engine 10 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 54 closes and intake valve 52 opens. Air is introduced into cylinder 30 via an intake manifold, for example, and the piston moves to the bottom of the combustion chamber so as to increase the volume within cylinder 30. The position at which the piston is near the bottom of the combustion chamber and at the end of its stroke (e.g. when cylinder 30 is at its largest volume) is typically referred to by those of skill in the art as bottom dead center (BDC). During the compression stroke, intake valve 52 and exhaust valve 54 are closed. The piston moves toward the cylinder head so as to compress the air within cylinder 30. The point at which the piston is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 92, resulting in combustion. Additionally or alternatively compression may be used to ignite the air/fuel mixture. During the expansion stroke, the expanding gases push the piston back to BDC. A crankshaft may convert piston movement into a rotational torque of the rotary shaft. Finally, during the exhaust stroke, exhaust valve 54 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the cylinder 30.

The intake system 150 includes a first compressor 160 and a second compressor 162. The first compressor 160 is configured to increase the density of the intake air during operation. In one example, the compressor may be a variable geometry compressor. However, in other examples the geometry of the rotor vanes may be fixed. The first compressor 160 may be included in a turbocharger. The turbocharger may further include a first turbine 163 rotational coupled to the compressor positioned in the exhaust system 152. However, in other examples the first compressor and/or second compressor may be drive via the rotational output of the engine.

The second compressor 162 may be identical to the first compressor 160. Additionally, the first compressor 160 and the second compressor 162 are shown coupled in parallel. However, other compressor configurations have been contemplated. For instance, the compressors may be coupled in series. The second compressor 162 may also be coupled to a second turbine 165 in the exhaust system 152 and included in a turbocharger. The first compressor 160 and the second compressor 162 receive intake air denoted via arrows 164.

An air cooler 170 is positioned downstream of the first compressor 160 and the second compressor 162. The air cooler 170 may be referred to as a charger air cooler in a boosted engine. However, in other examples, the air cooler 170 may be used in an intake system that does not include compressors.

The air cooler 170 includes a first inlet port 172 and a second inlet port 174. The first inlet port 172 is in fluidic communication with the first compressor 160. Likewise, the second inlet port 174 is in fluidic communication with the second compressor 162. Therefore in the depicted example compressed intake air is provided to the air cooler 170.

Arrow 176 denotes the fluidic communication between the first inlet port 172 and the first compressor 160. Specifically, an intake conduit may extend between the first compressor 160 and the first inlet port 172. Arrow 178 denotes the fluidic communication between the second inlet port 174 and the second compressor 162. Again, the arrow 178 may specifically denote an intake conduit or in some example a plurality of intake conduits.

The air cooler 170 further includes an inlet manifold 180. The first inlet port 172 and the second inlet port 174 open into the inlet manifold 180 to flow intake air thereto. The inlet manifold 180 is in fluidic communication (e.g., direct fluidic communication) with a plurality of air flow conduits 182. Thus, the inlet manifold 180 directs intake air to the plurality of air flow conduits 182. Thus, intake air flows from the inlet manifold to the air flow conduits during engine operation. In one example, a plurality of turbulators 306, shown in FIG. 3, discussed in greater detail herein may be positioned in the air flow conduits 182.

Cooling fins 184 or other suitable heat dissipation devices may be positioned between and coupled to the air flow conduits 182. Ambient air may flow through the cooling fins 184 to remove heat therefrom. In this way, heat may be transferred from the air cooler to the surrounding environment. The cooling fins 184 may be coupled to a housing of the air flow conduits 182.

An air flow deflector 186 may be coupled to the air flow conduits 182 and positioned in the inlet manifold 180. The air flow deflector 186 is generically depicted in FIG. 1. However, it will be appreciated that the air flow deflector 186 has additional complexity that is described in greater detail herein with regard to FIGS. 2-8. The air flow deflector 186 may be configured to direct air to desired portions of the air flow conduits 182 and reduce (e.g., block) airflow through other portions of the air flow conduits 182. Specifically, the air flow deflector 186 is configured to increase the velocity of the air through central portions of the air flow conduits 182. As a result, the likelihood of formation of condensation in the air flow conduits is reduced. The air flow deflector 186 may have greater complexity than the example shown in FIG. 1. Detailed examples of the air cooler are shown in FIGS. 2-8 and discussed in greater detail herein.

The air cooler further includes an outlet manifold 188. The outlet manifold 188 includes an outlet port 190. The outlet port 190 is in fluidic communication with a throttle 192 including a throttle plate 194. The throttle is configured to adjust the amount of intake airflow provided to the intake valve 52 while the intake valve is open. The throttle is coupled to an intake conduit, denoted via arrow 196, in fluidic communication with the intake valve 52. Thus, intake air may flow from the air cooler to the intake valve during combustion operation in the engine.

Figure 2:
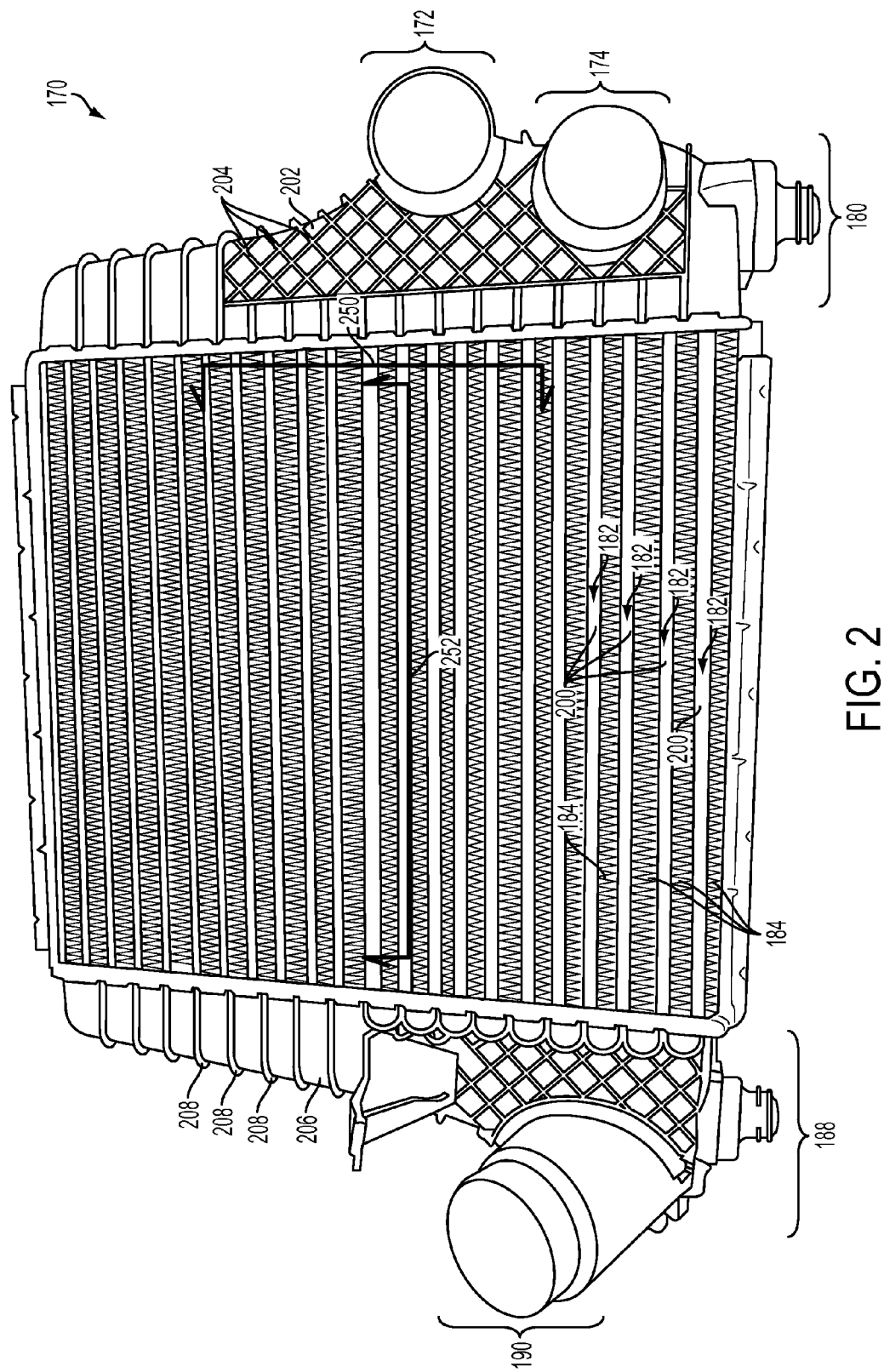
FIG. 2 shows an example air cooler which may be included in the intake system shown in FIG. 1.

FIG. 2 shows an example air cooler 170. The inlet manifold 180 and outlet manifold 188 of the air cooler 170 are shown in FIG. 2. The first inlet port 172 and the second inlet port 174 in the inlet manifold 180 are also shown. As discussed above with regard to FIG. 1 the first and second inlet ports may be in fluidic communication with the first compressor 160 and the second compressor 162.

The outlet port 190 of the outlet manifold 188 in fluidic communication with the intake valve 52, shown in FIG. 1 is also depicted in FIG. 2. The cooling fins 184 in the air cooler 170 are also shown in FIG. 2. The cooling fins 184 may comprise a metal such as aluminum, steel, etc. The cooling fins 184 are shown extending between the air flow conduits 182 and specifically housings 200 of the air flow conduits.

The inlet manifold 180 includes a housing 202 having reinforcing ribs 204. Likewise, the outlet manifold 188 includes a housing 206 having reinforcing ribs 208. The inlet manifold 180 and/or outlet manifold 188 may include a polymeric material. Additionally or alternatively the inlet manifold 180 and/or outlet manifold 188 may comprise a metal (e.g., aluminum, steel, etc.)

The inlet manifold 180 tapers in a direction extending away from the inlet ports (172 and 174). Likewise, the outlet manifold 188 tapers in a direction extending away from the outlet port 190. However, other inlet and outlet manifold geometries have been contemplated.

The air cooler 170 shown in FIG. 2 includes 21 air flow conduits 182. However, air coolers with an alternate number of air flow conduits have been contemplated. For example, the air cooler may include less than 21 air flow conduits, in some examples.

The cutting plane 250 defining the cross-section shown in FIG. 4, FIG. 5, FIG. 6, or FIG. 7 is shown in FIG. 2. The cutting plane 252 defining the cross-section shown in FIG. 7 is shown in FIG. 2.

FIG. 3 shows a first example cross-sectional view of a portion of the air cooler 170. The air flow conduits 182 are depicted in FIG. 3. Each of the air flow conduits 182 may have a substantially identical size and geometry. However, in other examples the size and geometry of the air flow conduits 182 may vary between two or more air flow conduits. For example, the longitudinal length and/or lateral width of the air flow conduits 182 may vary between two or more conduits. A longitudinal axis and a lateral axis are provided for reference.

Air flow conduit housings 200 define the flow boundaries of each of the air flow conduits 182. It will be appreciated that intake air may flow into the air flow conduits 182 from the inlet manifold 180, shown in FIGS. 1 and 2. Generally, this direction may be into the page. However, it will be appreciated that the air flow pattern may have additional complexity. The air flow conduits 182 each include an inlet 300.

The air flow deflector 186 is also shown in FIG. 3. The air flow deflector 186 is fixedly coupled (e.g., adhesively glued, welded, bolted, etc.,) to the housings 200 of the air flow conduits 182. In this way, the relative position of the air flow deflector and the air flow conduits is substantially fixed. The air flow deflector 186 includes a plurality of peripheral sections 302, each of the sections extending across portions of the inlets 300 to the air flow conduits 182. Specifically, a first portion of the peripheral sections 302 are positioned on one side of the inlets and a second portion of the peripheral sections 302 are positioned on a second side of the inlets. Therefore, two of the peripheral sections are positioned on opposing sides of one of the inlets 300. The peripheral sections 302 are identical in size and geometry in the example depicted in FIG. 3. However, in other examples the peripheral sections 302 may not be identical in size and/or geometry. In one example, the plurality of peripheral sections 302 are connected to one another via a single continuous piece of material. Thus, the air flow deflector 186 may be formed from a single continuous piece of material. However, in another example the air flow deflector may not form a single continuous piece of material and the peripheral sections may be spaced away from one another. The air flow deflector 186 may comprise a polymeric material, in some examples. However, in other examples the air flow deflector 186 may comprise a metal such as aluminum, steel, etc.

Further, the air flow deflector 186 is coupled (e.g., welded, adhesively bonded, bolted, etc.) to the housing 200 of the air flow conduits 182. Adhesively bonding may include applying a vulcanization sealant, such as a room temperature vulcanization (RTV) sealant, between the coupled elements. When the air flow deflector 186 is adhesively bonded to the air flow conduits the velocity of the air flow through unobstructed portions 304 of the air flow conduits 182 may be increased.

The cooling fins 184 are also shown in FIG. 3. However, in others examples, the air flow deflector 186 may be positioned in front of the cooling fins 184 shown in FIG. 3. Thus, the air flow deflector 186 may includes sections extending between the peripheral sections of the air flow deflector and/or between the air flow conduits in some examples.

Each air flow conduit 182 includes an unobstructed portion 304. The boundary of the unobstructed portions 304 are defined by the air flow deflector 186. Thus, the velocity of the air flow through the unobstructed portion 304 may be greater than the velocity of the air flow through the portions of the air flow conduits obstructed by the air flow deflector 186. Increasing the velocity of the air flow through a central portion of the conduits, decreases condensation in the air flow conduits thereby increasing the longevity of the air cooler 170 and decreases engine misfires. As a result, combustion efficiency is increased.

The turbulators 306 are also shown in FIG. 3. One or more turbulators are positioned within each of the air flow conduits 182. Thus each air flow conduit encloses a turbulator. The turbulators 306 may be coupled (e.g., welded) to the housing of the corresponding air flow conduits. The turbulators 306 are shown repeatedly extending across the air flow conduits 182. Specifically, each turbulator in an air flow conduit traverses the air flow conduit 27 times creating 14 "V" channels. The turbulators 306 in the depicted example are formed from a continuous piece of material (e.g., metal). However, alternate turbulator 306 sizes and/or geometries have been contemplated. The turbulators 306 may also extend into the sections of the air flow conduits 182 obstructed by the air flow deflector 186. However, in other examples, the turbulators 306 may not extend into the sections of the air flow conduits 182 obstructed by the air flow deflector 186 The turbulators 306 may increase the amount of heat transferred to the housings 200 from the intake air, thereby increasing the amount of heat removed from the intake air flowing through the air cooler. In the depicted example, the turbulators 306 in each of the air flow conduits have a similar geometry and size. However, the size and/or geometry of the turbulators may vary between air flow conduits. In some examples, the air flow deflector 186 may be coupled (e.g., welded, adhesively bonded, etc.) to turbulators 306. However, in other examples the air flow deflector 186 may be spaced away from the turbulators 306. It will be appreciated that in some example the air cooler may not include the turbulators.

The contour of an outer surface 308 air flow deflector 186 may be non-planar. Specifically, the depth of the outer surface 308 may decrease around the inlets 300 of the air flow conduits 182. The depth in the cross-section shown in FIG. 3 is an axis extending into the page. However, in other examples the outer surface of the air flow deflector may be planar.

A longitudinal length 310 of each air flow conduit 182 may be 57 millimeters (mm) in one example. A longitudinal length 312 of the unobstructed portion 304 in the corresponding air flow conduit may be 27 mm. A lateral width 314 of each air flow conduit 182 may be 9 to 10 mm in one example. A longitudinal axis and a lateral axis are provided for reference.

FIGS. 4-7 show different examples of a cross-section of the air cooler 170 shown in FIG. 2. However, it will be appreciated that the cross-sections shown in FIGS. 4-7 may all be included in different air coolers, in some examples.

Specifically, FIG. 4 shows a second example cross-section of the air cooler 170. As shown, the longitudinal length of each of the peripheral sections 302 of the air flow deflector 186 has been increased. A longitudinal axis is provided for reference. Thus, the size of the unobstructed portions 304 are decreased when compared to the example cross-section of the air cooler shown in FIG. 3. In this way, the air flow deflector 186 may be tuned for a variety of types of engines by changing the size and/or geometry of the air flow deflector 186. The size and/or geometry may be altered to achieve a desired air velocity in the unobstructed portions of the air flow conduits 182. The desired velocity for a typical customer drive cycle may be around minimum 12 m/s once every 10 to 20 min depending on road grade, vehicle acceleration, and vehicle mass, in one example. It will be appreciated that other geometric characteristics of the air flow deflector 186 may be altered such as the overall width of the air flow deflector or the width of specified sections of the air flow deflector 186.

Figure 5:
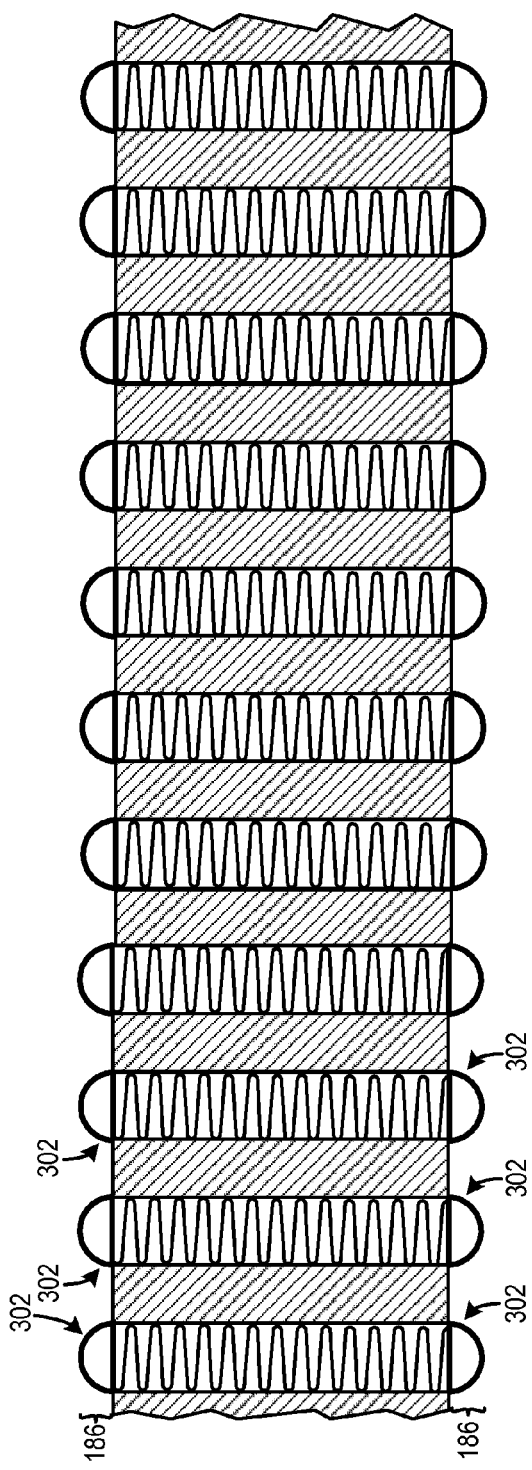

FIG. 5 shows a third example of the cross-section of the air cooler 170 shown in FIG. 2. The air flow deflector 186 in the third example air cooler includes individual peripheral sections 302. In other words, the air flow deflector 186 includes a plurality of peripheral sections spaced away from one another. As a result, the amount of material in the air flow deflector 186 is reduced thereby reducing the air flow deflector's cost.

Figure 6:
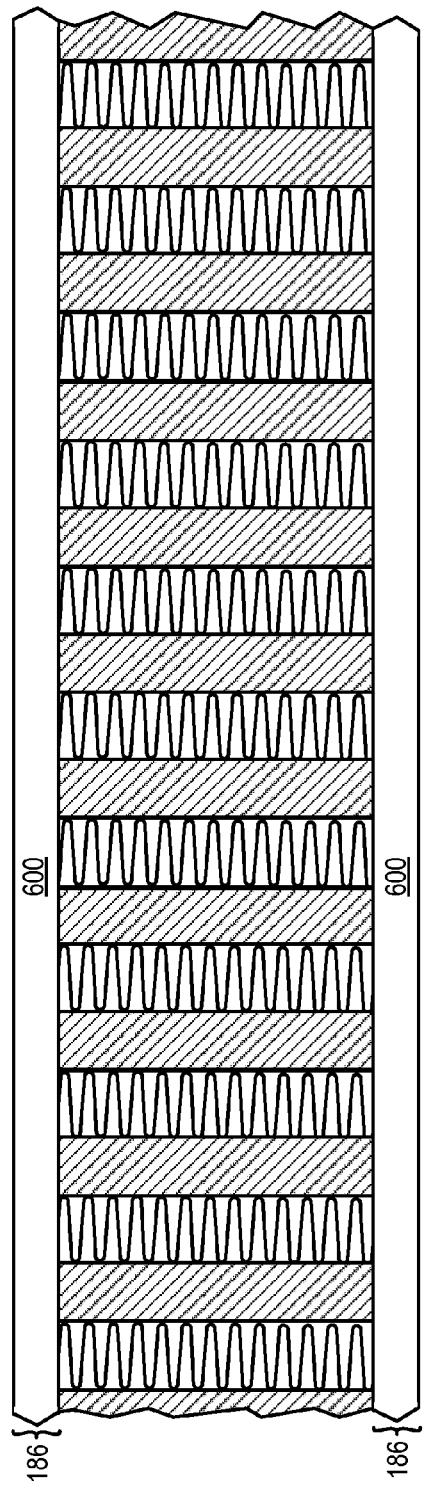

FIG. 6 shows a fourth example cross-section of the air cooler 170 shown in FIG. 2. The outer surfaces 600 of the air flow deflector 186 are planar in the example shown in FIG. 6. However, other contours have been contemplated. Furthermore, the peripheral sections of the air flow deflector 186 are in the shape of plates in the example depicted in FIG. 6.

FIG. 7 shows a fifth example cross-section of the air cooler 170 shown in FIG. 2. In the example shown in FIG. 7 the air flow deflector 186 includes sections 700 positioned between the air flow conduits 182. The sections 700 are also positioned in front of the cooling fins, whose view is obstructed by the sections 700. The peripheral sections 302 are also shown in FIG. 7. It will be appreciated that the air flow deflector 186 is formed of a continuous piece of material in the example shown in FIG. 7.

FIG. 8 shows another cross-sectional view of the air cooler 170 shown in FIG. 2. FIG. 8 shows a portion 800 of one of the air flow conduits 182 shown in FIG. 2. A plurality of turbulators 802 are shown in FIG. 8. The plurality of turbulators shown in FIG. 8 may be included in the plurality of turbulators 306 shown in FIG. 3.

The turbulators 802 shown in FIG. 8 are axially offset. However, alternate turbulator positioning has been contemplated. Axially offsetting the turbulators 802 may increase the amount of turbulence in the air flow conduits 182. As a result, the heat transfer from the intake air to the turbulators and/or air flow conduit housing may be increases, thereby increasing the intake air cooling. Consequently, combustion operation may be improved. Arrows 804 depict the general direction of intake air flow through the turbulators 802. It will be appreciated that the intake air flow has additional complexity that is not depicted.

FIG. 9 shows an example turbulator 900 which may be included in the plurality of turbulators 306 shown in FIG. 3 and/or the plurality of turbulators 802 shown in FIG. 8. The turbulator 900 includes openings 902 (e.g., slits, louvers). However, in other examples, the turbulators 306 may not includes openings.

Figure 10:
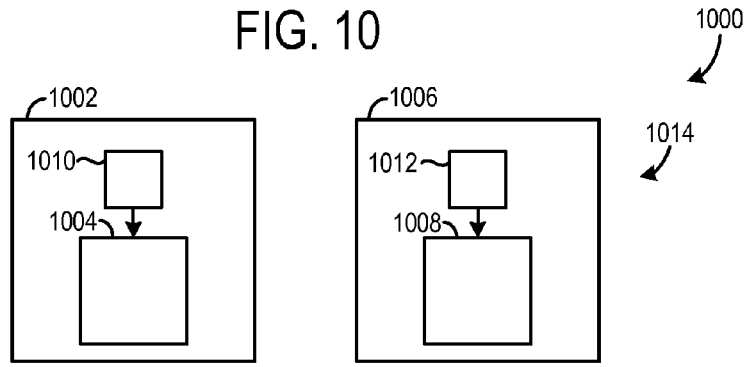
FIGS. 10-12 show an example air cooler line.

FIG. 10 shows a vehicle line 1000. Certain components in the vehicle line, such as the air coolers, may share similar characteristics to simplify manufacturing, thereby decreasing manufacturing costs. However, certain characteristics of the air coolers may be altered to adjust the flow characteristics for different engine configurations. In this way, applicability of vehicle line may be increased, enabling similar air coolers to be used in a wide range of engines while decreasing the manufacturing cost of the air coolers.

The vehicle line 1000 includes a first vehicle 1002 having a first engine 1004 and a second vehicle 1006 having a second engine 1008. However, vehicle lines with a greater number of vehicles and engines have been contemplated. A first air cooler 1010 included in the first vehicle 1002 is configured to supply the first engine 1004 with intake air. Likewise a second air cooler 1012 included in the second vehicle 1006 is configured to supply the second engine 1008 with intake air.

It will be appreciated that the first vehicle 1002, the first engine 1004, the second vehicle 1006, and/or second engine 1008 may be similar to the vehicle 100 and engine 10 shown in FIG. 1. For example, the first engine 1004 and the second engine 1008 may each include a cylinder having an intake valve and an exhaust valve and two compressors positioned upstream of the air coolers. Additionally, the first air cooler 1010 and/or second air cooler 1012 may have similar components to the air cooler 170 shown in FIGS. 1 and 2. Therefore, the first air cooler 1010 and the second air cooler may include similar components to the air cooler 170 shown in FIG. 1. Thus, the air coolers (1010 and 1012) may include inlet manifolds, inlet ports, outlet manifold, outlet ports, heating fins, air flow conduits, turbulators, and/or air flow deflectors. The first air cooler 1010 and the second air cooler 1012 may be included in an air cooler line 1014.

Figure 11:
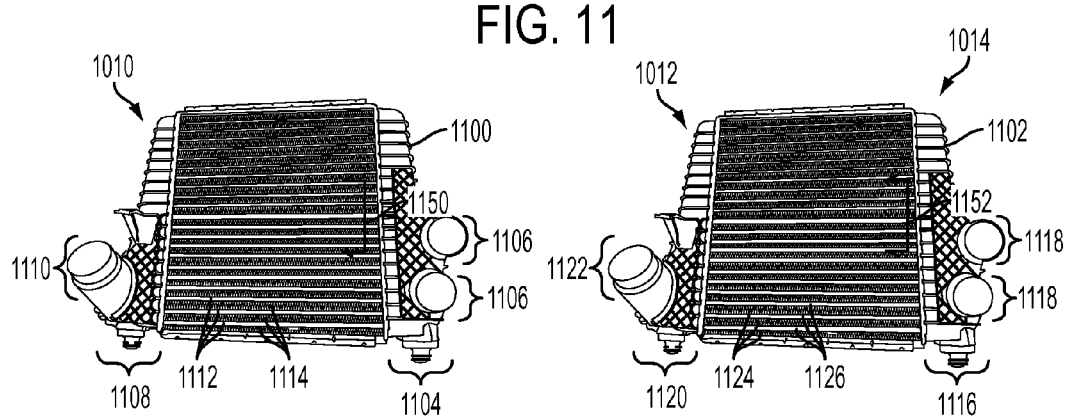

FIG. 11 shows an example air cooler line 1014 that may be included in the vehicle line 1000 shown in FIG. 10. As shown, a housing 1100 of the first air cooler 1010 may be substantially identical in size and shape to a housing 1102 of the second air cooler 1012. However, air coolers with housings having a different shape and/or size have been contemplated.

The first air cooler 1010 further includes an inlet manifold 1104, inlets ports 1106, outlet manifold 1108, an outlet port 1110, cooling fins 1112, and air flow conduits 1114. The inlet ports may each be in fluidic communication with an upstream compressor.

Likewise the second air cooler further includes an inlet manifold 1116, inlets ports 1118, outlet manifold 1120, an outlet port 1122, cooling fins 1124, and air flow conduits 1126. The inlet ports may each be in fluidic communication with an upstream compressor. The inlet manifold 1116 is configured to flow intake air into the air flow conduits 1126. Likewise, the air flow conduits 1126 are configured to flow intake air into the outlet manifold 1120. As shown, the cooling fins are positioned between the air flow conduits.

The inlet manifold 1108 in the first air cooler 1010 is similar in size and shape to the inlet manifold 1116 in the second air cooler 1012. Additionally, the outlet manifold 1108 in the first air cooler 1010 is similar in size and shape to the outlet manifold 1120 in the second air cooler 1012. The air flow conduits 1114 in the first air cooler 1010 may be similar in size and shape to the air flow conduits 1126 included in the second air cooler 1012. Specifically, the number, size, and geometry of the plurality of air flow conduits 1114 may be equivalent to number, size, and the plurality of air flow conduits 1126 in some example. In this way, air flow conduits for a number of different air coolers may be jointly manufactured, if desired, thereby decreasing manufacturing costs. Furthermore, the first air cooler 1010 has the same number of air flow conduits as the second air cooler 1012. The cooling fins 1112 are identical in size and shape to the cooling fins 1124. However, air coolers with inlet manifolds, outlet manifolds, cooling fins, and/or air flow conduits having varying sizes and/or geometries have been contemplated.

Figure 12:
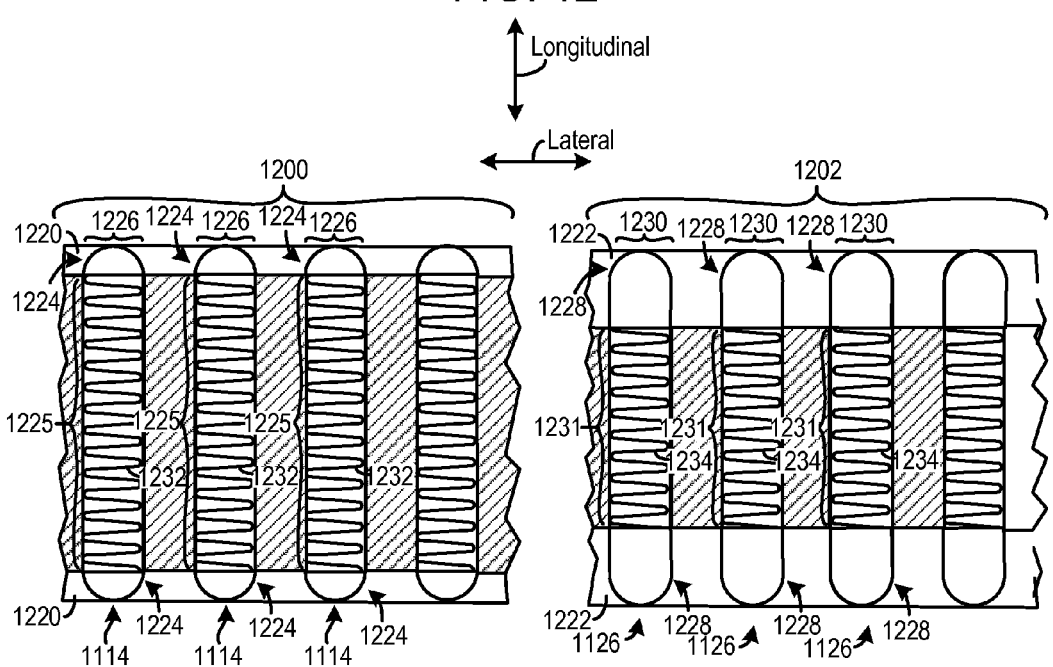

Cutting plane 1150 defines the cross-section of the first air cooler 1010 shown in FIG. 12 and cutting plane 1152 defines the cross-section of the second air cooler 1012 shown in FIG. 12.

FIG. 12 shows an example cross-section 1200 of the first air cooler 1010 and an example cross-section 1202 of the second air cooler 1012. Alternatively, it will be appreciated that either of the cross-sections of the air coolers (1010 and 1012) denoted in FIG. 11 may be one of the cross-sections shown in FIGS. 2-7.

The air flow conduits 1114 in the first air cooler 1010, shown in FIG. 11, are depicted in FIG. 12. Likewise, the air flow conduits 1126 in the second air cooler 1012, shown in FIG. 11, are depicted in FIG. 12.

As shown, the air flow conduits 1114 and the air flow conduits 1126 have a similar longitudinal length and lateral width. A longitudinal axis and a lateral axis are provided for reference. The air flow conduits in separate air coolers may have a similar size and shape to increase the applicability of the air coolers and decrease manufacturing costs. However, air coolers having air flow conduits with different sizes and/or geometries have been contemplated.

FIG. 12 also shows a first air flow deflector 1220 in the first air cooler 1010 and a second air flow deflector 1222 in the second air cooler 1012. At least one of the first air flow deflector 1220 and the second air flow deflector 1222 may form a continuous piece of material, in some examples. However, in other examples, one or more of the air flow deflectors may include non-continuous sections spaced away from one another.

The first air flow deflector 1220 includes peripheral sections 1224 extending across inlets 1226 of the plurality of air flow conduits 1114. The air flow deflector 1220 defines a boundary of unobstructed portions 1225 of the air flow conduits 1114. The second air flow deflector 1222 also includes peripheral sections 1228 extending across inlets 1230 of the plurality of air flow conduits 1126. The air flow deflector 1222 defines a boundary of unobstructed portions 1231 of the air flow conduits 1126. It will be appreciated that the unobstructed portions 1225 differ in at least one of size and geometry than the unobstructed portions 1231.

As shown, the air flow deflectors (1220 and 1222) have a different size and shape. Specifically, the longitudinal length of the second air flow deflector 1222 is greater than the longitudinal length of the first air flow deflector 1220. In this way, the second air flow deflector 1222 has a larger surface area extending across the air flow conduits than a surface area of the first air flow deflector 1220 extending across the air flow conduits.

However, altering different dimensions between the first and second air flow deflectors has been contemplated. It will be appreciated that altering the longitudinal length of the air flow deflectors adjust the air flow velocity through the air flow conduits. In this way, size of the unobstructed portions of the air flow conduits may be selected based on desired air flow characteristics in a specific air cooler and engine, enabling the air coolers to be tuned for different application. As a result, the applicability of the air cooler line is increased. It will be appreciated that the air flow deflectors (1220 and 1222) may be added to the air cooler at a late stage in the manufacturing process, thereby allowing fine tuning of the design quickly instead of waiting many months for new design tools.

A plurality of turbulators 1232 position in the air flow conduits 1114 and a plurality of turbulators 1234 positioned the air flow conduits 1126 are also shown. In some examples, the first air cooler 1010 includes a first number of turbulators and the second air cooler 1012 includes a second number of turbulators differing from the first number of turbulators. As discussed above each of the turbulators may include a continuous piece of material extending across an air flow conduit two or more times.

The first air flow deflector 1220 is fixedly coupled to the plurality of air flow conduits 1114. Likewise, the second air flow deflector 1220 is fixedly coupled to the plurality of air flow conduits 1126. The first air flow deflector 1220 and/or the second air flow deflector 1222 may be adhesively coupled to their respective air flow conduits. For example, a vulcanization sealant may be used to couple the air flow deflectors to the air flow conduits.

The first air flow deflector 1220 and/or the second air flow deflector 1222 may comprise a polymeric material in one example. In another example, first air flow deflector 1220 and/or the second air flow deflector 1222 may comprise a metal. Further in some example, the first air flow deflector 1220 may comprise a different material than the second air flow deflector 1222.

Figure 13:
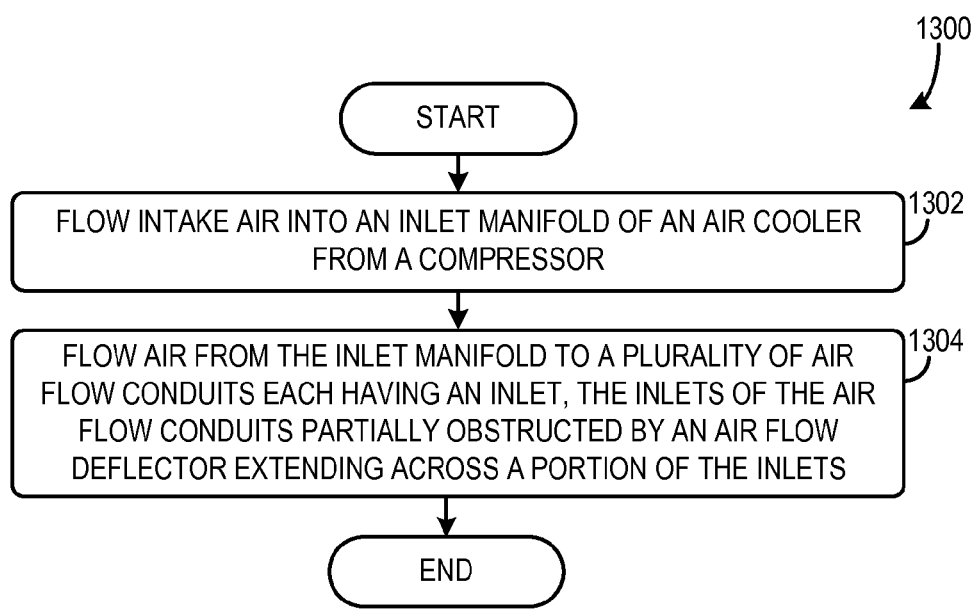
FIG. 13 shows a method for operating an intake system of an engine.

FIG. 13 shows a method 1300 for operating an intake system in an engine. The method 1000 may be implemented by the intake system, engine, air cooler, components, etc., discussed above with regard to FIGS. 1-12 or may be implemented via other suitable intake systems, engines, air coolers, components, etc.

At 1302 the method includes flowing intake air into an inlet manifold of an air cooler from a compressor. At 1304 the method includes flowing air from the inlet manifold to a plurality of air flow conduits each having an inlet, the inlets of the air flow conduits partially obstructed by an air flow deflector extending across a portion of the inlets. In one example the air flow deflector does not obstruct central portions of each of the air flow conduits. Further in one example, each of the air flow conduits include at least one turbulator enclosed by a housing of the air flow conduit. In this way, air may be redirected in the air cooler to increase the speed of the air traveling through the air flow conduits, thereby decreasing condensation in the air cooler and increasing the longevity of the air cooler.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air cooler line comprising:
a first air cooler having a plurality of air flow conduits, each of the air flow conduits including an inlet, and a first air flow deflector extending across peripheral portions of each of the inlets and fixedly coupled to the air flow conduits and partially obstructing the inlets; and
a second air cooler having a plurality of air flow conduits, each of the air flow conduits including an inlet, and a second air flow deflector extending across peripheral portions of each of the inlets and fixedly coupled to the air flow conduits and partially obstructing the inlets, the second air flow deflector differing in at least one of size and geometry than the first air flow deflector, wherein a longitudinal length of extension across the peripheral portions in the second air cooler is larger than a longitudinal length of extension across the peripheral portions in the first air cooler.

2. The air cooler line of claim 1, where the second air flow deflector has a larger surface area extending across the air flow conduits in the second air cooler than a surface area of the first air flow deflector extending across the air flow conduits in the first air cooler, the first air cooler positioned in a first vehicle with a larger engine displacement, and the second air cooler positioned in a second vehicle with a smaller engine displacement.

3. The air cooler line of claim 1, where a number, size, and geometry of the plurality of air flow conduits in the first air cooler is equivalent to a number, size, and the plurality of air flow conduits in the second air cooler.

4. The air cooler line of claim 1, where the first and second air flow deflectors comprise a polymeric material.

5. The air cooler line of claim 1, where the first air flow deflector comprises a different material than the second air flow deflector.

6. The air cooler line of claim 1, where the first air cooler has the same number of air flow conduits as the second air cooler.

7. The air cooler line of claim 1, where the first and second air flow deflectors comprise a metal.

8. The air cooler line of claim 1, where the first air flow deflector is adhesively coupled to the plurality of air flow conduits in the first air cooler via a vulcanization sealant and the second air flow deflector is fixedly coupled to the plurality of air flow conduits in the second air cooler via the vulcanization sealant.

9. An air cooler line comprising:
a first air cooler having a plurality of air flow conduits, each of the air flow conduits including an inlet, and a first air flow deflector extending across peripheral portions of the inlets and fixedly coupled to the air flow conduits and partially obstructing the inlets; and
a second air cooler having a plurality of air flow conduits, each of the air flow conduits including an inlet, and a second air flow deflector extending across peripheral portions of the inlets and fixedly coupled to the air flow conduits and partially obstructing the inlets, the second air flow deflector differing in at least one of size and geometry than the first air flow deflector where each of the first and second air flow deflectors forms a single continuous piece of material.

10. The air cooler line of claim 9, where unobstructed portions of inlets of the air flow conduits in the first air cooler differ in at least one of size and geometry than unobstructed portions of inlets of the air flow conduits in the second air cooler.

11. The air cooler line of claim 9, where the first and second air coolers each include an inlet port in fluidic communication with a compressor.

12. The air cooler line of claim 9, where the first air cooler includes a plurality of turbulators positioned in the air flow conduits and the second air cooler does not include turbulators positioned in the air flow conduits.

13. The air cooler line of claim 9, where the first air cooler includes a first number of turbulators and the second air cooler includes a second number of turbulators differing from the first number of turbulators, each of the turbulators includes a continuous piece of material extending across an air flow conduit two or more times.

14. The air cooler line of claim 9, where the first air cooler includes a housing identical in shape and size to a housing of the second air cooler.

15. The air cooler line of claim 9, where the first air cooler includes cooling fins positioned between the air flow conduits, the cooling fins are identical in size and shape to cooling fins positioned between the air flow conduits in the second air cooler.

* * * * *